Nov. 19, 1968 C. H. THOMAS 3,411,981
METHOD AND ARTICLE FROM LAMINATING NON-FOAMED POLYURETHANE
ELASTOMER TO VINYL POLYMER WITH A FUSION BOND
Filed Feb. 24, 1966 2 Sheets-Sheet 1
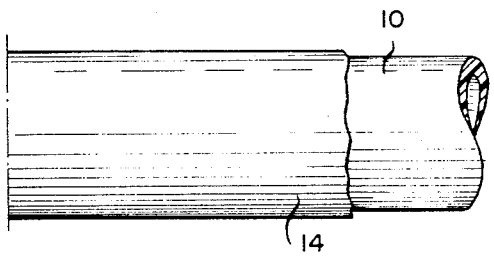
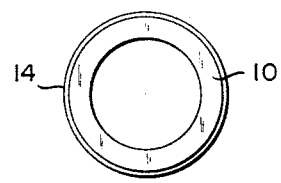
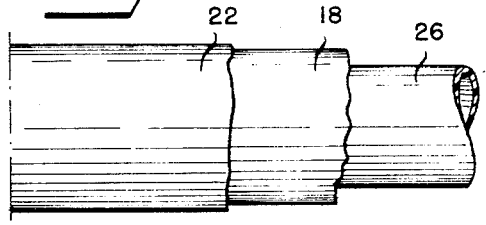
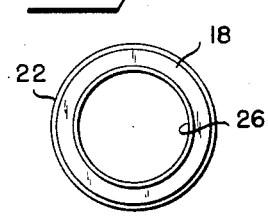
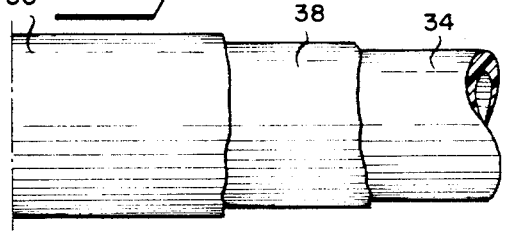
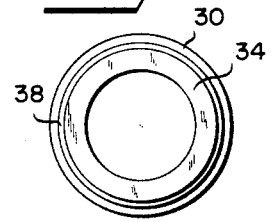
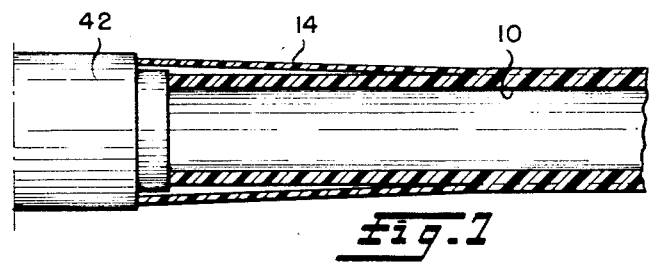
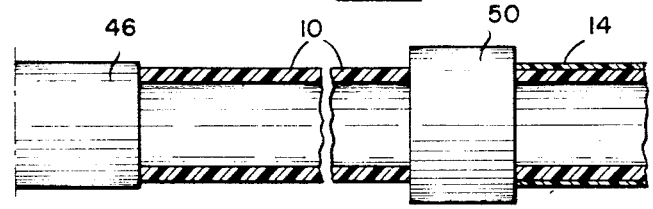
INVENTOR
Cyrus H. Thomas
BY *Strauch, Nolan & Neale*
ATTORNEYS Nov. 19, 1968  C. H. THOMAS  3,411,981
METHOD AND ARTICLE FROM LAMINATING NON-FOAMED POLYURETHANE
ELASTOMER TO VINYL POLYMER WITH A FUSION BOND
Filed Feb. 24, 1966  2 Sheets-Sheet 2
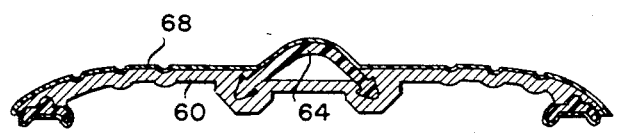
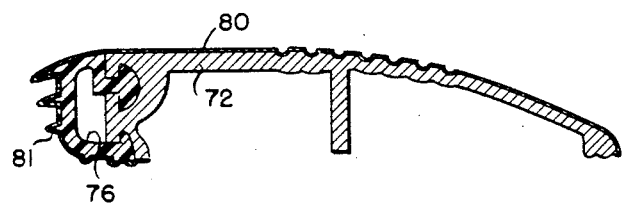
INVENTOR
Cyrus H. Thomas
BY
ATTORNEYS United States Patent Office 3,411,981
Patented Nov. 19, 1968

3,411,981
METHOD AND ARTICLE FROM LAMINATING NON-FOAMED POLYURETHANE ELASTOMER TO VINYL POLYMER WITH A FUSION BOND
Cyrus H. Thomas, Miami, Fla., assignor to Industrial Vinyls, Incorporated, a corporation of Florida
Continuation-in-part of application Ser. No. 211,365, July 20, 1962. This application Feb. 24, 1966, Ser. No. 544,064
8 Claims. (Cl. 161—190)

ABSTRACT OF THE DISCLOSURE

A resinous structure having a high bursting strength and abrasion resistance constructed from a laminate of a layer of a thermoplastic vinyl polymer and a thin layer of a thermoplastic polyurethane or a molded mixture of a thermoplastic vinyl polymer and a thermoplastic polyurethane.

---

This application is a continuation-in-part of my copending application, Ser. No. 211,365, filed July 20, 1962, and now abandoned.

This invention relates to novel, improved laminated plastic structures and to methods for preparing same. In particular, the invention is concerned with improved plastic structures comprising a thermoplastic polyurethane resin.

Synthetic polymers may, in general, be classified by the behavior of the polymers when heated. Thus, synthetic polymers which characteristically become hard and infusable upon application of heat may be classified as thermosetting polymers, while those synthetic polymers which characteristically soften upon application of heat and which are capable of re-softening are classified as thermoplastic polymers. Exemplary thermoplastic polymers are those prepared by the polymerization of vinyl compounds such as vinyl acetate, vinyl chloride, vinyl chloride/vinyl acetate mixtures, vinyl aldehyde, vinyl alcohol and the like, styrene, ethylene, cyclopentadiene, acrylics such as methyl methacrylate, fluorocarbons, terephthalic acid esters and the like. Exemplary thermosetting polymers are phenolic resins such as the phenol-formaldehyde resins, the resorcinol-formaldehyde resins, urea-formaldehyde resins, melamines, epoxy resins and the like. Another synthetic polymer, which until recently has been classified as a thermosetting polymer, is polyurethane.

The polyurethane resins possess certain desirable physical properties, such as high tensile strength and excellent solvent and abrasion resistance, which has led to their use in the fabrication of a wide variety of articles. Commonly, the polyurethanes have been prepared by the reaction of a polyisocyanate such as tolylene diisocyanate, and a multihydroxyl compound such as polyethylene glycol. More broadly, however, polyurethanes may be formed by a variety of methods known in the art, the most widely known method being the reaction of di- or polyfunctional hydroxyl compounds, for example polyesters or polyethers having terminal hydroxyl groups, with di- or polyfunctional isocyanates.

One of the earlier patents describing such methods is U.S. Patent No. 2,284,896 which describes the reactions of polyfunctional compounds containing active hydrogen atoms with polyisocyanates. Such poylurethane resins are classified as thermosetting resins and as such are only very difficultly adaptable to high speed processing techniques such as extrusion. Softening such thermosetting polyurethanes, by the addition of hydrocarbon softening or processing oils or by addition of conventional ester plasticizers, makes the polymer more easily processable but also results in a product having unsatisfactory physical properties. Coatings prepared from such thermosetting polyurethanes have not proved to be entirely satisfactory, since they must be applied to a substrate material by such methods as dipping, coating or spraying, these methods being rather slow and producing a bond between the polyurethane coating and the substrate which has not proved to be sufficiently strong for many industrial applications.

It has been only recently that polyurethanes have been developed which may be classified as thermoplastic resins. In contrast to the thermosetting polyurethanes described above, the newly developed thermoplastic polyurethanes may be easily extruded, as will be more fully described hereinafter, to form an easily applied and strongly adherent coating.

As indicated above, it has been the practice to apply thermosetting polyurethane coatings to articles composed of various types of plastic materials by dipping, spraying or painting a solution of an uncured thermosetting polyurethane onto the plastic article to be protected and thereafter heating the polyurethane in order to cure it. Such techniques are, obviously, time consuming and, moreover, do not provide a satisfactorily strong bond between the polyurethane coating and the substrate material. Due to the poor bonding between the layers in such a structure, each layer of plastic material acts more or less independently instead of in cooperation with the other layer or layers.

Accordingly, in view of the difficulties experienced in the prior art in obtaining satisfactory laminated articles comprising a thermosetting polyurethane, it is an object of this invention to provide novel laminated structures comprising a thermoplastic polyurethane material, said thermoplastic polyurethane being incorporated into such structure in the form of one or more thin layers.

Another object of this invention is to provide novel structures comprising a vinyl polymer having a thin film of thermoplastic polyurethane bonded thereto.

A further object of this invention is to provide novel structures comprising a substrate of thermoplastic vinyl polymer having a thin film of thermoplastic polyurethane bonded thereto.

A further object of this invention is to provide novel structures comprised of a homogeneous mixture of a vinyl polymer and a thermoplastic polyurethane.

Another object of this invention is to provide a method for applying a thin film of thermoplastic polyurethane to a vinyl polymer substrate.

Another object of this invention is to provide a method for forming an article comprised of a vinyl polymer and simultaneously applying thereto a thin film of thermoplastic polyurethane.

The above objects, and other objects which will become apparent to those skilled in the art, are attained by the present invention wherein, briefly, novel laminated plastic structures are formed by applying a thin film of a thermoplastic polyurethane elastomer to a vinyl polymer substrate or by blending a thermoplastic polyurethane elastomer with a suitable vinyl thermoplastic polymer material to form a mixture and thereafter subjecting the mixture to molding temperatures to obtain a homogeneous composition and subsequently shaping the homogeneous composition, if necessary. A further aspect of this invention comprises forming structures having a plurality of layers, wherein alternate layers are composed of a thermoplastic polyurethane resin.

Further aspects of this invention will become apparent from the following detailed description when taken in connection with the accompanying drawings which illustrate preferred embodiments of the invention and wherein:

FIGS. 1 and 2 illustrate a multilayered, composite tubular structure such as a garden hose or the like. The core or substrate 10 is composed of a thermoplastic vinyl polymer such as, for example, polyvinylchloride of conventional wall thickness, i.e., 0.055 inch to 0.125 inch. Bonded thereto is a thin film 14 of polyurethane which was formed during simultaneous extrusion of the core and the film. Due to the unique bond formed between the thermoplastic polyurethane and the thermoplastic vinyl polymer by the method of this invention, it has been found that garden hoses produced therefrom have burst strengths which show significant improvement over the use of commercial vinyl polymer garden hose. It has been found, for example, that garden hose comprising a thin thermoplastic polyurethane film of approximately 3-10 mils in thickness has a burst strength on the order of 100 lbs. greater than the core alone and significantly greater than commercial vinyl garden hose.

FIGS. 3 and 4 illustrate another embodiment of a laminated tubular structure which may be prepared in accordance with the method of this invention and which may be utilized for gasoline hose and the like. In this embodiment, a tubular core 18 of a thermoplastic vinyl polymer is provided with a thin film of thermoplastic polyurethane, 22 and 26, on the interior and exterior surfaces thereof. The exterior polyurethane surface provides excellent wear and abrasion properties and, coupled with the interior polyurethane film 26 and vinyl polymer core 18, provides a flexible, light-weight hose having exceptionally high burst strength.

A further embodiment of a laminated tubular structure of the invention is illustrated in FIGS. 5 and 6 wherein a tubular structure composed of two layers, 30 and 34, of a thermoplastic vinyl polymer is reinforced by a thin thermoplastic polyurethane film 38 interposed therebetween and bonded thereto.

The method of simultaneously extruding the core 10 and the film 14, illustrated in FIGS. 1 and 2, is shown in FIG. 7. Simultaneous extrusion apparatus 42 permits the film 14 and tubular core 10 to be extruded and fused while each is still in a partially molten condition during extrusion. A superior high strength bond is thereby attained.

FIG. 8 illustrates a composite tubular structure made in accordance with this invention and embodying a homogeneous composition prepared from a blended mixture of a thermoplastic vinyl polymer and a thermoplastic polyurethane elastomer.

FIG. 9 illustrates another extrusion method of the invention wherein a first extrusion apparatus 46 extrudes the tubular thermoplastic vinyl polymer core 10 while a subsequent extruding apparatus 50 extrudes a thin thermoplastic polyurethane film 14 onto the surface of the core 10, thus effecting a fusion between the film 14 and core 10 by virtue of the hot state of the thermoplastic film as it issues from the extruder.

Another practical application of the present invention is illustrated in FIG. 10 wherein a door threshold is shown, in transverse section, having a rigid support member 60 adapted to be secured to the threshold by nailing or screwing or by other suitable means and comprised of a thermoplastic, rigid vinyl substrate and a thin film 68 of a thermoplastic polyurethane on selected surface areas thereof. A flexible sealing member 64, which may also be a thermoplastic vinyl polymer, may be similarly protected with a thin surface of thermoplastic polyurethane film and adapted to deformably engage a door, window or the like. The thin film of polyurethane 68 is extruded or molded onto the threshold support member and the threshold sealing member to withstand the great abrasive forces which can be expected on such door pieces. Because of the high strength of the bond between the thermoplastic polyurethane film and the vinyl polymer substrate, adhesive materials are not necessary.

Another threshold sealing device is illustrated by transverse section in FIG. 11 wherein there is shown a substrate member 72, a flexible sealing member 76 removably attached thereto and a thin film of thermoplastic polyurethane film 80 and 81 bonded to the exposed surfaces thereof.

In accordance with the present invention, composite structures are prepared which comprise one or more layers of thermoplastic vinyl polymer and one or more layers, in the form of thin films, of thermoplastic polyurethane.

The vinyl polymers which may be used to prepare articles of manufacture in accordance with the present invention are prepared from ethylenically unsaturated monomers such as the vinyl halides, e.g. vinyl chloride and vinylidene chloride; olefins such as ethylene and propylene; unsaturated acid esters such as vinyl acetate, methylmethacrylate and ethylacrylate; or vinyl aromatics such as styrene and the like which are conventionally prepared by solution, dispersion or emulsion polymerization techniques. When it is intended that a foamed vinyl polymer be used, blowing agents which release $CO_2$ (e.g. $NaHCO_3$), $N_2$ (e.g. azides), $NO_2$ (e.g. nitroso compounds) and the like may be incorporated therein prior to extrusion.

The thermoplastic polyurethanes which are used to form the composite plastic articles of the present invention are polyester urethanes which, for example, may be prepared by the reaction of a hydroxyl terminated polyester, an aromatic diisocyanate and an alkoxy diol. The ratio of polyester and alkoxy diol to aromatic diisocyanate is such that there is essentially no free unreacted diisocyanate, diol or polyester remaining after the reaction. The thermoplastic polyurethanes may be prepared by reacting, for example, one mole of a hydroxyl terminated polyester with from about 1 to 3 moles of an alkoxy diol and from about 2 to 4 moles of an aromatic diisocyanate. The ratio of reactants is regulated in a manner such that the molar equivalent of aromatic diisocyanate equals the combination of the molar equivalents of polyester and alkoxy diol present in the reaction mixture.

The polyester is a hydroxyl terminated polyester having a molecular weight between about 500 and 5000 and may be prepared, for example, by esterification of an aliphatic dicarboxylic acid or anhydride thereof with a glycol. Polyesters may be prepared for example, by esterification of aliphatic dicarboxylic acids such as adipic, succinic, sebacic or the like or their anhydrides.

The aliphatic diols which may be utilized in the preparation of the polyester are aliphatic diols such as 1,4-butanediol, ethylene glycol, trimethylene diol, hexmethylene diol and the like.

Alkoxy diols which may be employed in the preparation of the polyester urethanes used in the invention may be di(hydroxyalkoxy)-aromatic compounds such as, for example, 1,4-bis(2-hydroxyethoxy)benzene, 1,4-bis(3-hydroxypropoxy) benzene and like. Such compounds are prepared by reacting an alkylene chlorohydrin or alkylene oxide with an appropriate dihydroxy compound such as hydroquinone, resorcinol and the like.

The aromatic diisocyanates used to prepare the polyester urethanes may include such materials as, for example, dichlorodiphenylmethane diisocyanate, dimethyldiphenylmethano diisocyanate, 4,4'-diphenylmethane diisocyanate and the like.

Suitable thermoplastic polyurethane elastomers which may be used in accordance with the present invention are the currently available commercial products designated by the trademarks Texin (Mobay Chemical Co.) and Estane (B. F. Goodrich Chemical Co.) As generally disclosed in Walker, "Texin Solid Urethane Elastomers," Rubber World, vol. 144, No. 4, July 1961, pp. 76–77 and 84; d'Adolf, "Urethane Rubbers Growing in Use," Rubber World, vol. 144, No. 4, July 1961, pp. 67–71; Texin Topics, Mobay Chemical Co.; Data Sheet-Texin 480A, Mobay Chemical Co., March 1962; Technical Information Bulletin 62–E19, Mobay Chemical Co., Jan. 23, 1961; Canadian Patent No. 640,610 issued May 1, 1962; U.S. Patent No. 2,729,618 (example 12) issued Jan. 3, 1956, Texin may be described as a polyurethane elastomer exhibiting thermoplastic characteristics made by reacting from 20–100 parts by weight of a diisocyanate with 100 parts by weight of a polyester, to said reaction mixture being added a cross-linking agent such as 1,4-butane diol. Estane is a true thermoplastic elastomer in that it is virtually completely cured and yet retains its thermoplastic nature. It is prepared from 4,4'-diphenylmethane diisocynanate, adipic acid and 1,4-butanediol. Its structure may be represented as follows:

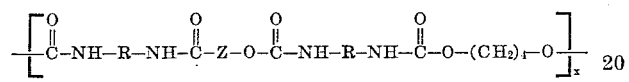

where Z is

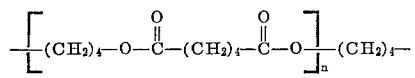

and R is

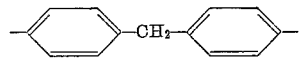

The number average molecular weight of the elastomer is about 36,000. It does not require the use of vulcanizing agents such as peroxides, etc. and is thermoplastic though virtually completely cured. The table, below, summarizes and compares the more important physical properties of a typical thermoplastic elastomer of the type described above with a conventional plasticized polyvinyl chloride resin.

TABLE

| Property | PVC | Thermoplastic Polyurethane |
|---|---|---|
| Melt index at— | | |
| 44 p.s.i., 190° C., g./10 min | 0.2 | 1 |
| 440 p.s.i., 190° C., g./10 min | 42 | 40 |
| Density, 23°/4° C., g./cc | 1.273 | 1.21 |
| Vicat Softening Point, °C | 58 | 67 |
| Tensile Strength, p.s.i | 3,300 | 4,560 |
| Brittleness Index, 80% pass, °C | −20 | −65 |
| Tear resistance, lb./in | 475 | 705 |
| Grease resistance | (¹) | (²) |
| Flex-crack resistance, total length of slit after 500,000 cycles at 23° C., mils | 250 | 121 |
| Abrasion resistance, g. lost/1,000 cycles | 0.083 | 0.0005 |

¹ Failed in 24 hr.
² No failures in 24 hr.

As shown by the figures hereinabove discussed, for example, FIG. 7 which shows a solid thin film 14 of polyurethane, the thermoplastic polyurethanes contemplated by the present invention are nonfoamed elastomers. The term "nonfoamed" is well known in the art and this well known meaning of the term is applicable here.

By virtue of the exceptionally tight fusion resulting from the simultaneous extrusion of the composite vinyl polymer/thermoplastic polyurethane articles made in accordance with the invention, such articles exhibit properties which are not merely cumulative in effect but which are greater than the sum of the properties of the individual resins utilized. It is believed that this effect is achieved because of the unique bonding which takes place between the vinyl polymer and the thermoplastic polyurethane which is not attained by prior art methods of coating articles with a thermosetting polyurethane. The following examples will serve to further illustrate preferred embodiments of the invention.

It is to be understood, however, that the examples are not intended to be construed as limitation of the scope of the invention, but are merely illustrative.

Example 1

A thermoplastic vinyl polymer formulation was prepared comprising polyvinyl chloride, di-isooctyl phthalate as primary plasticizer, epoxidized soybean oil as secondary plasticizer and mechanically ground calcium carbonate. The material was then fed to a storage bin for subsequent use in the preparation of tubing which was tested in accordance with the examples set forth below.

At the same time, a linear thermoplastic polyurethane elastomer was prepared from diphenylmethane-p,p'-diisocyanate, adipic acid and butanediol-1,4. This material was also transferred to a storage bin for further use in the examples set forth below.

Example 2

The polyvinyl chloride resin and the thermoplastic polyurethane resin described in Example 1 were separately but simultaneously extruded in accordance with the method illustrated in FIG. 7 to form a tube having a wall thickness of .070 inch and, bonded thereto, a thin, exterior film of thermoplastic polyurethane having a thickness of .010 inch. Such tubing is suitable for garden hose construction. The burst pressure of the garden hose so prepared was tested and the product was found to have a burst strength of 225 p.s.i.

In comparison with the garden hose described above and which was prepared in accordance with this invention, a garden hose having an .080 inch wall but consisting solely of polyvinyl chloride was tested and found to have a burst strength of only 125 p.s.i.

For further comparison, a commercial vinyl hose consisting of a core of scrap which was skin-coated with polyvinyl chloride resin was tested and was found to have a burst strength of 170 p.s.i. The commercial vinyl hose had a wall thickness varying from .080–.085 inch.

Example 3

The materials described in Example 1 were simultaneously extruded to form a garden hose having a wall thickness of .085 inch and, bonded thereto, a thin exterior film having a thickness of .005 inch, of thermoplastic polyurethane. The garden hose so constructed was found to have a burst strength of 245 p.s.i.

A second garden hose was prepared which consisted solely of polyvinyl chloride and having a wall thickness of .090 inch. This garden hose had a burst strength of 200 p.s.i.

A commercial vinyl garden hose consisting of an inner tubular core of polyvinyl chloride scrap and an outer skin of high grade polyvinyl chloride. The commercial hose had an overall wall thickness varying from .080–.085 inch. This hose was tested and found to have a burst strength of 170 p.s.i.

Example 4

Two garden hoses were prepared. One was prepared in accordance with the method of this invention and consisted of an inner tubular core of polyvinyl chloride having a wall thickness of .085 inch and a thin outer film of thermoplastic polyurethane having a thickness of .005 inch. The second garden hose was prepared from high grade commercial polyvinyl chloride resin and had a wall thickness of .090 inch. Various tubular sections were prepared from each hose formulation at varying extruder speeds. The hose sections thus prepared were then tested and their comparative burst strengths noted. The extruder speeds and the burst strengths obtained from the hoses prepared at each extruder speed are set forth below.

| | Burst Strength (lbs. per square inch) | |
|---|---|---|
| | PVC (.085 inch) Polyurethane (.005 inch) | PVC (.090 inch) |
| Speed, Ft./Min.: | | |
| 12 | 245 | 200 |
| 20 | 250 | 200 |
| 26 | 235 | 205 |
| 32 | 245 | 200 |
| 34 | 250 | 200 |

Example 5

In this example two garden hoses were prepared, one consisting entirely of commercial polyvinyl chloride and the other consisting of an extruded mixture of 94% polyvinyl chloride and 6% thermoplastic polyurethane (described in Example 1). The latter hose was composed of a homogeneous blend of the polyvinyl chloride and polyurethane as a result of the concurrent mixing and heating in the extruder. The properties of the two hoses were then compared. The results are listed below:

| | PVC | Blend |
|---|---|---|
| Hardness, Shore A | 83 | 83 |
| Tensile, p.s.i. | 1,839 | 2,052 |
| Modulus, 100% | 1,197 | 1,159 |
| Elongation | 292 | 324 |

Similar results were obtained when hoses were prepared containing blends of from 85–94% polyvinyl chloride and correspondingly from 15–6% thermoplastic polyurethane.

When it is desired to produce articles having a configuration other than tubular, the mixture of vinyl polymer and polyurethane is heated to molding temperature in order to effect a homogeneous composition and the composition is then subjected to conventional plastic article forming procedures.

It is to be understood that articles may be prepared as described herein where the vinyl polymer substrate is in the form of a foam. In this aspect of the invention, the selected vinyl polymer base formulation is mixed with a blowing agent, as set forth above, in a ratio of from six to 100 grams of blowing agent per 100 pounds of polymer formulation prior to extrusion. For best operation of the extruder and for best control of surface quality, the ratio of blowing agent to vinyl polymer formulation is preferably in the range of about 20 to about 40 grams of blowing agent per 100 pounds of vinyl polymer formulation.

The blowing agent may be added either in dry or paste form. The preferred method is to add the blowing agent to the vinyl polymer formulation as a paste consisting of 50% to 70% blowing agent in dioctylphthalate.

In the above examples, the composite laminated articles are preferably formed by simultaneous extrusion as illustrated in FIG. 7. The polyvinylchloride extruder has a diameter of 2 to 2½ inches and comprises four heating zones set at successively higher temperatures of about 280° F., 300° F., 320° F. and 340° F. The polyurethane extruder has a diameter of about 1½ inches and traverses two heating zones wherein temperatures are maintained at about 320°–340° F. From the extruders, the melts are fed to at least one and preferably to a plurality of dies which are heated to the same temperature as the extruder heads. As the melts issue from the extruders, they are united while still hot so as to fuse the layers of polyvinylchloride and polyurethane to each other. If the article being prepared is a hollow structure such as a tube, air is entered through a spider in the die in order to keep the tube from collapsing. The article is then transferred to a water bath where the article is quenched. The water is then blow off and the article, if a tubular structure, is cut to length. Further details as to the apparatus discussed hereinabove and method of forming articles are set forth in applicant's copending application, Ser. No. 314,699 filed Oct. 8, 1963, now U.S. Patent No. 3,331,900 issued July 18, 1967.

When the article to be prepared is to consist of a foamed polyvinylchloride substrate, a blowing agent as set forth above is metered to the extruder in such a manner that the blowing agent decomposes while issuing from the extruder head. Thus, in order to achieve foaming at the proper time for extrusion, it is essential that the blowing agent have a decomposition temperature corresponding to the melt temperature of polyvinylchloride, i.e. 320–330° F.

It is to be understood that the thermoplastic compositions from which articles are prepared in accordance with this invention may contain conventional compounding agents such as fillers, pigments, dyes, stabilizers, plasticizers and the like.

Further, it is obvious that a great variety of articles may be prepared in accordance with this invention, including furniture tape, furniture welting, cover base, floor tile, window channels, auto panels, disposable oil containers, mortar boxes, disposable soft drink bottles and the like.

Obviously many modifications and variations of the invention are possible in the light of the above teachings. It is therefore to be understood that, within the scope of the appended claims, the invention may be practiced otherwise than as specifically described.

I claim:
1. A laminated structure comprising a layer of a vinyl polymer bonded to a strongly adherent layer of a non-foamed thermoplastic polyurethane, said bond being a fusion bond and requiring no additional adhesive materials.

2. A laminated structure according to claim 1 wherein said layer of polyurethane is a thin film thereof.

3. A laminated structure according to claim 2 comprising a plurality of layers wherein alternate layers comprise said thin film of polyurethane.

4. A laminated structure according to claim 2 wherein said layer of vinyl polymer is a foamed layer of said polymer.

5. A laminated structure according to claim 2 wherein said layer of vinyl polymer is of tubular configuration.

6. A laminated structure according to claim 5 wherein a thin film of thermoplastic polyurethane is bonded to the interior and exterior surfaces of said tubular vinyl polymer layer.

7. A process of forming a laminated strongly bonded structure of a vinyl polymer and a strongly adherent thermoplastic polyurethane without the addition of adhesives comprising extruding a layer of vinyl polymer, forming a thin film of said thermoplastic polyurethane, contacting said layer of vinyl polymer with said thin film of thermoplastic polyurethane while at their fusion temperature to thereby form a strong fusion bond between said film and said layer.

8. A process according to claim 7 wherein said thin film of polyurethane is formed by extruding it simultaneously with the extrusion of said layer of vinyl polymer.

No references cited.

EARL M. BERGERT, *Primary Examiner.*

C. B. COSBY, *Assistant Examiner.*